United States Patent [19]

Mages et al.

[11] Patent Number: 5,527,140

[45] Date of Patent: Jun. 18, 1996

[54] BUSH FOR LOCKBOLT RIVET, AND ASSOCIATED TOOL

[75] Inventors: Walter Mages, Alsfeld; Gerhard Turlach, Osterode, both of Germany

[73] Assignee: Huck International GmbH & Co., Osterode/Harz, Germany

[21] Appl. No.: 39,011

[22] PCT Filed: Jul. 15, 1992

[86] PCT No.: PCT/EP92/01604

§ 371 Date: May 20, 1993

§ 102(e) Date: May 20, 1993

[87] PCT Pub. No.: WO93/03282

PCT Pub. Date: Feb. 18, 1993

[30] Foreign Application Priority Data

Jul. 26, 1991 [DE] Germany .................... 41 24 787.6

[51] Int. Cl.⁶ ........................................... F16B 19/05
[52] U.S. Cl. .................................... 411/360; 411/276
[58] Field of Search .......................... 411/360, 361, 411/2–5, 276, 277, 283, 285, 430

[56] References Cited

U.S. PATENT DOCUMENTS

| | | |
|---|---|---|
| 550,898 | 12/1895 | Richardson ........................ 411/276 |
| 2,330,511 | 9/1943 | Money ............................. 411/276 |
| 2,542,376 | 2/1951 | Torresen .......................... 411/277 |
| 3,139,786 | 7/1964 | Ardell ............................. 411/361 |
| 3,464,472 | 9/1969 | Reynolds .......................... 411/361 |
| 3,560,124 | 2/1971 | Bergere ........................... 411/361 |
| 4,254,809 | 3/1981 | Schuster .......................... 411/277 |
| 4,544,312 | 10/1985 | Stencel ........................... 411/361 |
| 4,759,237 | 7/1988 | Fauchet ........................... 411/3 |
| 4,768,910 | 9/1988 | Rath .............................. 411/361 |

FOREIGN PATENT DOCUMENTS 944369  4/1941  France ............................ 411/785

OTHER PUBLICATIONS

"Machine Design", Apr. 9, 1981, B. F. Goodrich, p. 126.

Primary Examiner—Flemming Saether
Attorney, Agent, or Firm—Hopkins & Thomas

[57] ABSTRACT

The invention concerns a bush (13) to be formed around a lockbolt rivet (4) by means of a tool (14) which applies a longitudinal force, thus producing a high-strength riveted joint. The bush has substantially the shape of a hollow cylinder, but its shape deviates from rotational symmetry in such a way that when it is being formed around the lockbolt rivet (4), a torsional force acting in the direction of arrow (20) is superimposed on the longitudinal force acting in the direction of arrow (19).

9 Claims, 5 Drawing Sheets

5,527,140

BUSH FOR LOCKBOLT RIVET, AND ASSOCIATED TOOL

FIELD OF THE INVENTION

The invention refers to a bush (riveting collar) to be formed around a closing part, with indentations, of a lockbolt rivet by means of a tool which applies a axial force, thus producing a high-strength riveted joint; the bush has substantially the shape of a hollow cylinder. The invention also shows a tool for carrying out the forming of a bush on a closing part, with indentations, of a lockbolt rivet under application of an axial force, whereby said tool has a pincer section for gripping the break-off part of the lockbolt rivet and a set-head which acts in conjunction with the bush.

A lockbolt riveted joint normally consists of a lockbolt rivet and a bush. The lockbolt rivet has a shank supporting a head at one end, and the other end of which changes to a closing part as well as a break-off part. A break-off groove is provided between closing Dart and breakoff part. The bush acts in conjunction with the closing part of the lockbolt rivet during the forming of said bush. It is shaped like a hollow cylinder and during the forming process it is changed, through deformation and work-hardening, into such a shape that the material from which it is made flows, at least partly, into the indentations in the closing part of the lockbolt rivet.

A bush of the aforementioned type is known from DE-PS 32 15 228, DE-OS 30 25 676 or U.S. Pat. No. 3,915,053. The bush is in each case shaped like a hollow cylinder, the axial length of which matches the closing part of the associated lockbolt rivet. The front parts of the bush may be rounded off or be provided with a chamfer which serves to ease the handling. Upon forming the bush on the closing part of the lockbolt rivet, it is known to employ a tool which has a pincer section and a set-head. The pincer section grips the break-off part of the lockbolt rivet and via the set-head the bush is subjected to plastic deformation. During its deformation, the bush is acted upon by an axial force, in fact a compressive force which gives rise to axial tensions in the bush which in turn lead to the deformation. High deformation forces and axial tensions are necessary in order to let the bush flow in the desired manner. It is particularly important here that the material of the bush fills the indentations in the closing part of the lockbolt rivet as much as possible or even completely. This happens depending on the particular shape and arrangement of the indentations in the closing part of the lockbolt rivet shank.

The axial tensions required for deforming the bush and the associated axial deformation forces are very large. The larger the forces, the easier and more complete is the deformation of the bush. However, the deformation forces, as axial forces at the head of the lockbolt rivet, are supported by the component concerned. As the head of the lockbolt rivet is in many cases relatively small, the force which can be transmitted is limited. If this force is exceeded, the head breaks off. High deformation forces and axial tensions are necessary for getting the material of the bush to flow. If lower axial forces and correspondingly lower tensions are employed, the indentations in the closing part of the lockbolt rivet will not be completely filled by the bush. The consequence of this is that the strength of the riveted joint is also correspondingly lower.

SUMMARY OF THE INVENTION

It is the object of the invention to demonstrate a bush of the aforementioned type and/or to create a tool, the use of which results in an easier flowing of the material of the bush into the indentations in the closing part of the lockbolt rivet.

According to the invention, this is achieved with the bush of the aforementioned type in that it has a shape which deviates from rotational symmetry, that a torsional stress is superimposed on the axial tension during the forming of the bush on the closing part of the lockbolt rivet, whereby the material of the bush flows into the indentations in the closing part under the simultaneous action of the axial tension and the torsional stress. Therefore, the bush is no longer designed with rotational symmetry as before, but instead has a shape which, upon forming, initiates a rotational movement of the bush about its axis so that in addition to an axial tension acting, a torsional stress also ensues or is superimposed respectively. In doing this, the invention also applies the hypothesis of the largest shape-modification work, known from other contexts, to the forming of a bush on a lockbolt rivet. In contrast to the pure axial tension required for the shape modification according to the state-of-the-art, there results a reduced axial tension $\sigma_D$ according to the equation:

$$\sigma_v = \sqrt{[\sigma_D^2 + (a \cdot b \cdot \tau^2)]}$$

Here, $\sigma_v, \sigma$ is the comparison stress, '$\sigma_D$' the axial tension (compressive strain), 'a' and 'b' material factors and '$\tau$' the torsional stress (shearing strain). The simultaneous action of the axial tension and the torsional stress causes the material of the bush to flow better into indentations of the closing part of the lockbolt rivet during the forming process, and under reduced axial tension. The indentations in the closing part of the lockbolt rivet are thus filled better. Consequently, a higher-strength riveted joint is the result.

Looked at in detail, various possibilities result which can be realized from the bush shape which deviates from the rotational symmetry. Therefore, the bush can have ribs on at least one part of the outer and/or inner surface of its hollow cylinder and/or in the region of one or both front faces. These ribs act like bars under compressive loading which buckle at a certain compressive load and hence cause the rotational movement. The ribs can be arranged parallel to the bush axis so that different directions of rotation can result depending on the buckling process. However, it is also possible, by positioning the ribs at an angle, to predetermine the direction of rotation. Therefore, the ribs can, for example, be provided in the form of a coarse thread and/or with asymmetric cross-section. A coarse thread is particularly suitable in the region of the outer or inner surface area of the hollow cylinder. An asymmetric cross-section is advisably applied in the region of the front faces of the hollow cylinder of the bush. Of special importance is the arrangement of ribs on the inner surface of the hollow cylinder, i.e. where the material of the bush must flow the most when it molds to the indentations in the closing part of the lockbolt rivet. The torsional tensions are, therefore, directed right onto this point by way of this design.

The torsional tension can be increased when two surfaces of the bush are each provided with ribs which are arranged in such a way that both of the torsional tensions induced have the same direction of rotation. This applies especially for the arrangement of ribs on the two surface areas of the bush. A particularly strong rotation ensues through this arrangement when forming the bush.

However, the increase in the torsional stress can also be achieved through the opposite arrangement, namely having two surfaces of the bush are provided with ribs which are arranged in such a way that both the torsional tensions induced have opposing directions of rotation. This design refers especially to the arrangement of ribs in the regions of the front faces of the bush. If the two front faces of the bush are rotated in the opposite direction to each other, then a particularly strong rotation ensues here and it results in a particularly high induced torsional stress.

The principal concepts behind the present invention, i.e. the application of the hypothesis of the largest work of deformation on a lockbolt rivet/bush joint, can also be achieved through special design of the tool for forming the bush. The combined application is also possible, i.e. the special design of the bush and, in addition, the corresponding design of the tool. However, for simplification, only the design of the tool is described in the following. The torsional stress is in all cases introduced through a compulsory shape of the tool or through friction contact in the bush.

According to the invention, the tool is characterized in that it has a shape which deviates from rotational symmetry in such a way that the set-head also performs a rotational movement about its axis at least during a part of its axial movement to the pincer section. Thus, so that when forming the bush on the closing part of the lockbolt rivet a torsional stress is superimposed on the axial tension, whereby the material of the bush flows into the indentations of the closing part due to the simultaneous action of the axial tension and the torsional stress. In doing this, the given equation is used, whereby, in addition, the advantage occurs that the rotational movement inducing the torsional stress can be brought about by means of the tool. This relieves the head of the lockbolt rivet and the danger of breaking off the head of the lockbolt rivet is reduced because the axial force acting on the head is comparatively reduced.

In detail, the set-head and the pincer section can be guided onto each other by means of a thread, an oblique slot or similar, whereby the pitch and the other parameters are selected so that no self-locking occurs. The rotational movement and the torsional stress is then induced via this thread, oblique slot or similar. Other parameters are taken to include the different material pairs and the properties of the materials, in particular the different friction relationships.

The set-head of the tool can have projecting ribs and/or indentations on the surface where it makes contact with the bush. The ribs mold into the material of the bush during the forming of the bush, while vice versa, the material of the bush can penetrate into the indentations in the set-head so that a meshing, so to speak, occurs between the two parts. By this meshing a rotational movement can be effectively established, and thus a torsional strain can be induced.

The ribs and/or indentations can be arranged parallel or at an angle to the axis of the set-head. With a parallel arrangement, a rotational movement must be exerted on the tool in another way. With an angled arrangement, the rotational movement can be derived from an axial movement.

The tool can have a permanent or also a pulse-action drive. A pulse-action drive is understood to be a drive like a hammer on the bush, while a permanent drive is understood to be a force which, although the size of which changes, is, always present. The tool can be driven purely axially or also rotary.

BRIEF DESCRIPTION OF THE DRAWINGS

The invention will be further explained and described by means of the accompanying drawings.

DETAILED DESCRIPTION

Figure 1:
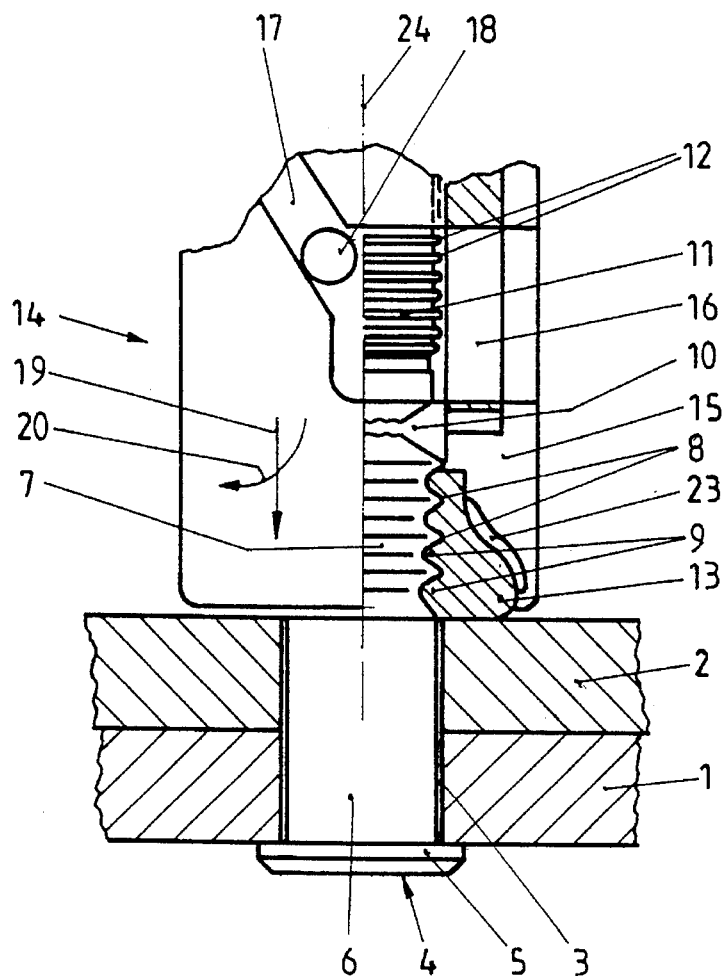
FIG. 1 is a representation of a lockbolt rivet with formed bush and tool directly upon completing the forming process, partly in section.

FIG. 1 shows the essential parts for the invention. The high-strength riveted joint is intended to hold two components 1 and 2 together. Both components 1 and 2 have a hole 3 which is in line and through which the lockbolt rivet 4 passes so that its head 5 lies on the open surface of component 1. The lockbolt rivet 4 also has a shank 6, which at first extends through the two components 1 and 2, and then changes to a closing part 7 which is provided on its periphery with circumferential projections 8 and circumferential indentations 9 arranged in between. Finally, connected via a break-off groove 10 which follows in the axial direction is the shank having a break-off part 11 which is also provided with circumferential ribs 12 on its periphery.

A bush or riveting collar 13 is allocated to the lockbolt rivet 4, and said bush has, in its initial condition, i.e. not deformed, roughly the shape of a hollow cylinder and in this respect two surface areas and two front faces. The bush 13 is shown in FIG. 1 already in its deformed condition, in fact at the end of the forming process, in which the break-off part 11 of the shank 6 has just broken off at the break-off groove 10.

A tool 14 is provided for the forming of the bush 13 on the closing part 7 of the lockbolt rivet 4, and said tool has a set-head 15 and a pincer section 16 as its main elements. The pincer section 16 is usually designed in two parts and has two jaws which have a shape corresponding to the ribs 12 so that the pincer section 16 can grip on the break-off part 11. Set-head 15 and pincer section 16 are guided together with an oblique slot 17 and a bolt 18. The oblique slot 17 can be arranged in the set-head 15, while the bolt 18 is arranged in the pincer section 16. Of course, the arrangement could be reversed. It is important that, in the end, not only an axial compressive deformation according to arrow 19 is exerted on the bush 13 via the oblique slot 17 in the set-head 15, but also that an additional rotational movement is superimposed according to arrow 20. This means that during the deformation of the bush 13, a torsional stress is superimposed on an axial tension within said bush. Hence, the material of the bush 13 flows more easily and more quickly, during its forming, into the indentations 9 of the closing part 7 of the lockbolt rivet 4 according to the hypothesis of the maximum work of deformation. Thus, the cross-section of the indentations are better filled. Although the deformation of the bush 13 takes place under an axial tension which is reduced in comparison to the state-of-the-art, the flow of the bush 13 material benefits from the superimposing of the torsional stress on the axial tension and, in the end, occurs under a reduced stress. The rotational movement inducing the torsional stress can, as in this case, be derived from the axial movement of the parts towards each other. However, it is also possible to turn the tool 14 in this manner and in this manner induce an additional torsional stress.

Figure 2:
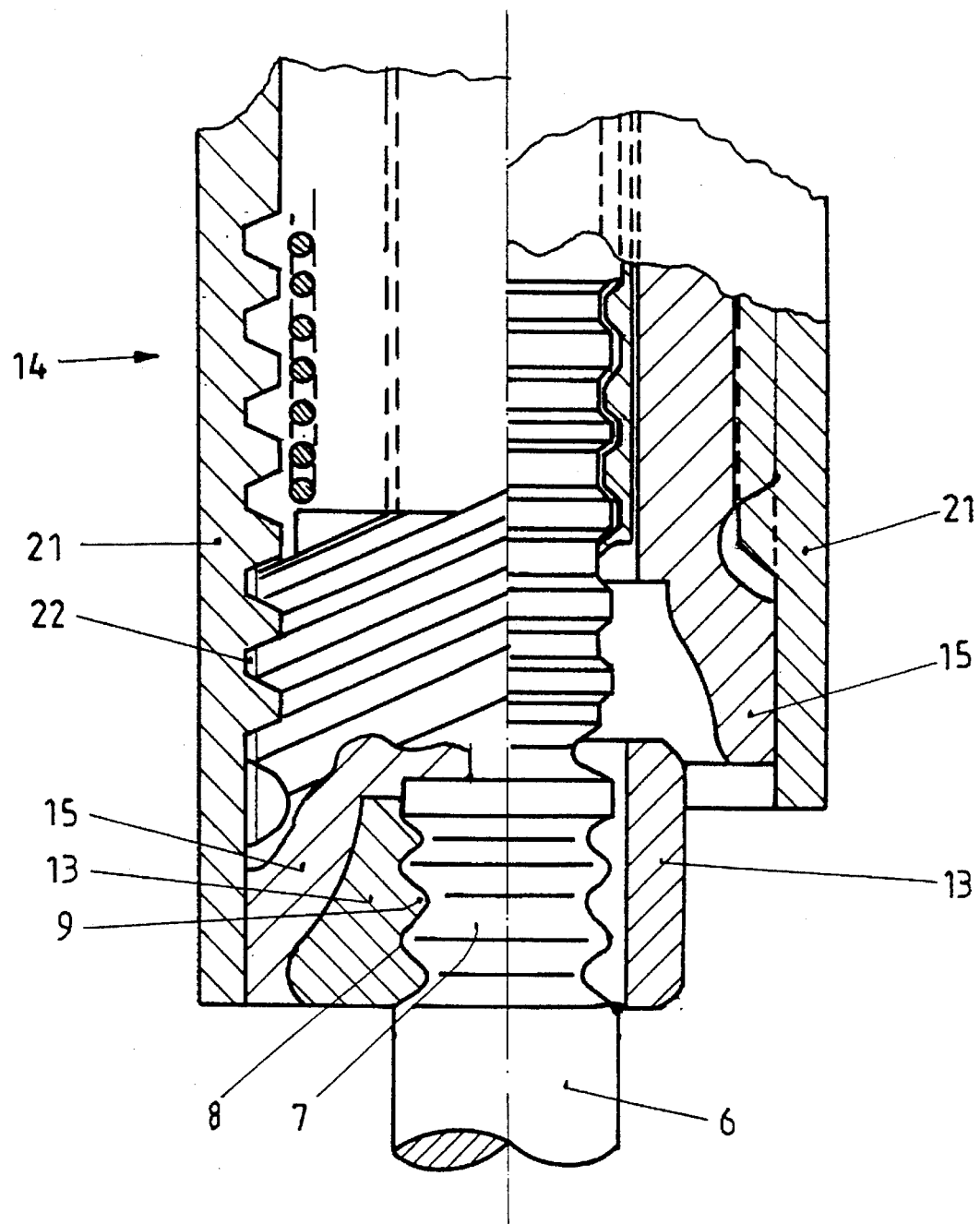
FIG. 2 shows the two half-sections of the main parts of a lockbolt rivet illustrating the bush and the tool at the beginning and at the end of the forming process.

FIG. 2 shows a cross-section through the tool 14, having a casing 21 in which the set-head 15 can be rotated with the aid of a thread 22. The pitch of the thread 22 and the other relationships are chosen so that no self-locking occurs during the forming. The function of the thread 22 in FIG. 2 corresponds to the function of the oblique slot 17 in the FIG. 1.

The right-hand half-section in FIG. 2 shows the relative position of the parts at the beginning of the forming of the bush 13, while the left-hand half-section reproduces the relationships at the end of the forming process.

Figure 3:
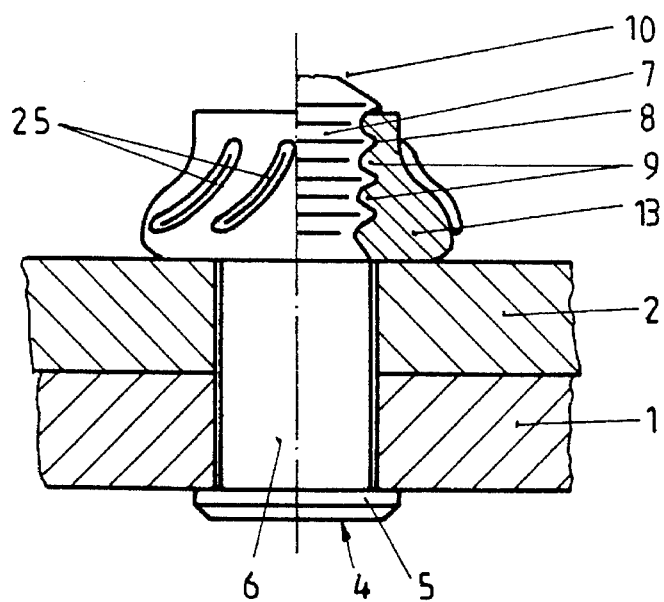
FIG. 3 is a representation of the formed bush on a lockbolt rivet, partly in section.

FIG. 3 essentially shows a bush 13 after its deformation. The tool 14 (FIG. 1) employed here has indentations 23 in the region of the set-head 15 where it makes contact with the bush 13. Thereby said indentations are arranged at an angle to the axis 24 of the tool 14 or the lockbolt rivet 4 respectively so that the bush 13 material not only molds into the indentations 9, but also accrues into the ribs 25 which are arranged at an angle on the outer periphery of the bush 13; The ribs 25 assist to superimpose a rotational movement during an axial movement of the set-head 15, whereby said rotational movement in turn manifests itself as an induced torsional stress in addition to the axial tension. FIGS. 1 to 3 illustrate an example in which the invention is realized by the tool 14. The bush 13 employed here can be used as a rotationally symmetric hollow item such as is known in the state-of-the-art and as is illustrated in the right-hand half-section in FIG. 2.

Figure 4:
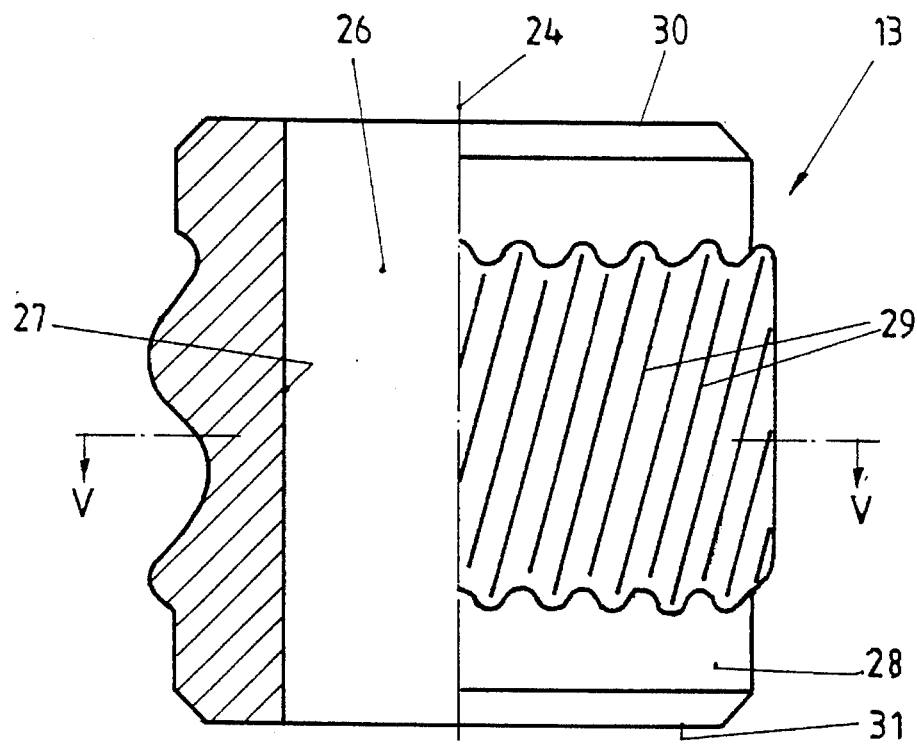
FIG. 4 is a side view of a bush designed according to the invention.
Figure 5:
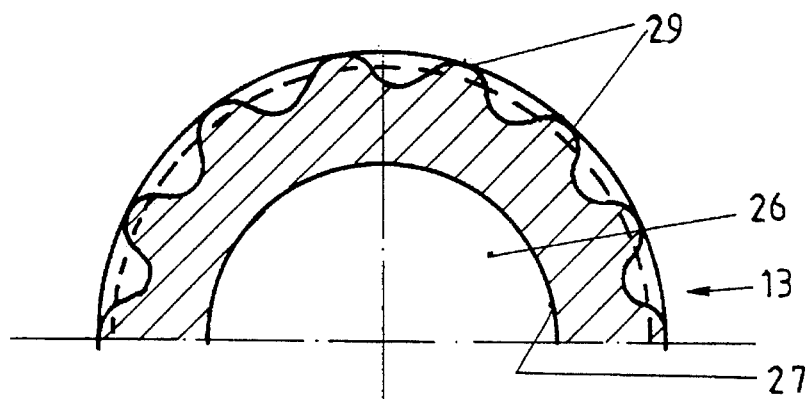
FIG. 5 is a cross-section along the line V—V in FIG. 4.

However, it is also possible to realize the invention at the bush 13 and to design this bush 13 according to the invention. FIGS. 4 and 5 show an embodiment example. Firstly, the bush 13 is constructed as a hollow cylinder, i.e. it has a recess (bore) 26 with an inner rotationally symmetric surface 27. On its outer surface 28, the bush 13 has projecting ribs 29 in a middle section which are provided at an angle to the axis 24. Under the action of compressive loading in the direction of the axis 24, these ribs 29 act like bars which deform in such a way that a rotational movement, and thereby a torsional stress, is induced in addition to the axial tension acting on the bush 13. The reduced stress then results from this.

The bush 13 according to FIGS. 4 and 5 has two front faces 30 and 31 which are constructed smooth, as in the past, and in this respect do not contribute anything to the torsional stress.

Figure 6:
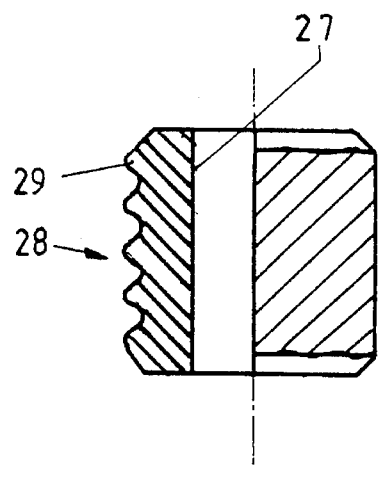
FIG. 6 Is a side view of the bush in a further embodiment version.

FIG. 6 shows a further embodiment version of the bush 13 with ribs 29 arranged at an angle in the region of the outer surface 28. The inner surface 27 is provided in the form of a cylindrical surface area.

Figure 7:
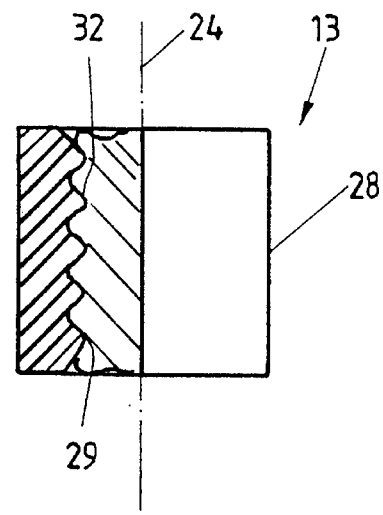
FIG. 7 is another embodiment version of the bush.

In contrast, FIG. 7 shows the construction of the inner surface 27 with ribs 32. The ribs 32 are arranged where the material of the bush 13 must undergo the greatest deformation. Here, the material must indeed penetrate into the indentations 9 between the projections 8 in the closing part 7 of the lockbolt rivet 4. The greatest torsional stress is exerted directly at this point, whereby a particularly easy and early influx of the material into the indentations 9 results.

The embodiment versions of FIGS. 6 and 7 can be realized at a bush 13 separately from each other but also jointly. The angled position of the ribs 29 and 32 usefully coincide here so that the rotational movement, effected by both ribs 29 and 32, has the same direction of rotation and in this respect the torsional stress is amplified.

Figure 8:
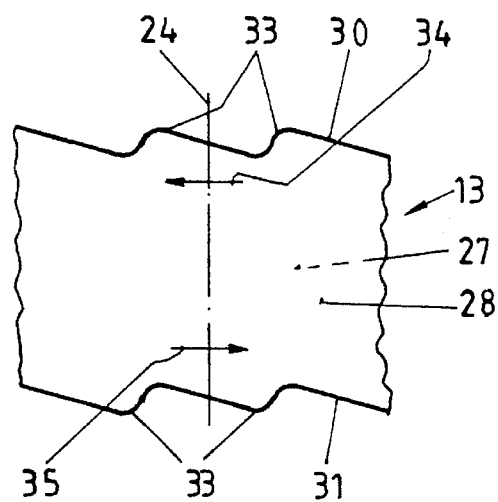
FIG. 8 is a partial plan view of another arrangement of the bush.

FIG. 8 illustrates a further embodiment version of a bush 13 by means of a part of this bush 13 which is shown as a plan of development. Here, the invention is not realized in the region of the surfaces 27 and 28 but rather in the region of the front faces 30 and 31. Here, a sort of meshing or interlock 33 with asymmetric cross-section is realized, whereby the asymmetry is arranged in opposing form so that upon compressive loading in the direction of the axis 24 in the region of the upper front face 30, a rotational movement in the direction of arrow 34 is induced, while in the lower region of the bush 13, a rotational movement according to arrow 35 is induced through the design of the front face 31. Arrows 34 and 35 oppose each other so that, in total, the rotation of the bush 13 is amplified and in this respect, a particularly high torsional stress is effected for superimposing on the axial tension.

Figure 9:
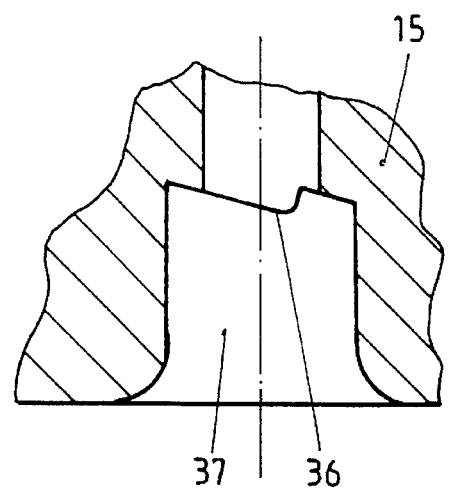
FIG. 9 is a detail cross-section from the set-head of the tool.

The construction according to FIG. 8 is already realized on a non-deformed bush 13. However, it is also possible to employ a hollow, cylindrical bush 13 in conjunction with a tool, the set-head 15 of which is illustrated in FIG. 9. Here, the meshing 36 is provided right over the periphery of the base of a recess 37 so that upon exerting the axial compressive force on a hollow, cylindrical bush 13 with front faces 30 and 31 running-rotationally symmetric. This meshing impresses and molds in the region of the front face 30 an the bush 13 so that a similar shape ensues, as shown in the upper part of FIG. 8.

Figure 10:
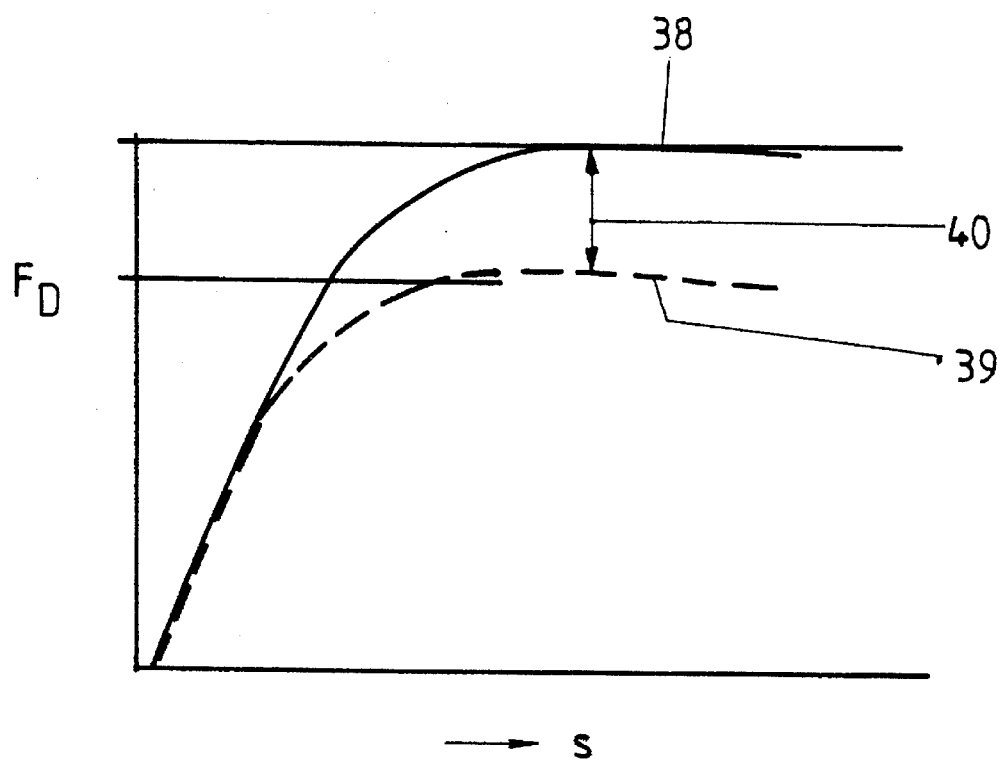
FIG. 10 is a diagram of the compressive force over the course of the deformation.

FIG. 10 shows a diagram of the compressive force 'Fd' over the course 's' in order to illustrate the differences between the state-of-the-art and the design according to the invention. The solid line 38 corresponds to the state-of-the-art upon application of a pure axial tension from an axially directed compressive force. The dotted line 49 corresponds to the present invention and indicates a reduced compressive force as a result of the superimposition of the axial tension and the torsional stress. The reduced compressive force acting on the bush 13 designed according to the invention results from the difference 40 between the two lines 38 and 39.

While a preferred embodiment of the invention has been disclosed in the foregoing specification and drawings, it will be understood by those skilled in the art that variations and modifications thereof can be made without departing from the spirit and scope of the invention, as set forth in the following claims.

We claim:

1. A bush adapted to be radially formed into indentations in a lockbolt rivet closing part by means of a tool which applies axial forces to said bush so as to create axial tension in said bush, comprising:

a cylinder having a hollow bore along a longitudinal axis, said cylinder having an outer surface, an inner surface, a first front face, and a second front face; and a plurality of projecting ribs formed on said bush for initiating rotational movement of said bush about said axis when said axial forces from said tool are applied to said bush so as to cause torsional stress in said bush, said ribs being orientated at an angle to said axis of said bush;

whereby, forming said bush around said closing part of said lockbolt rivet with said tool creates axial tension in said bush simultaneously as rotational movement of said bush causes torsional stress causing material of said bush to flow into said indentations in said closing part of said lockbolt rivet.

2. The bush of claim 1, wherein said ribs have an asymmetric cross section.

3. The bush of claim 1, wherein said ribs are in a form of a coarse thread.

4. The bush of claim 1, wherein said ribs are formed on said outer surface of said bush.

5. The bush of claim 1, wherein said ribs are formed on said inner surface of said bush.

6. The bush of claim 1, wherein said ribs are formed on said inner surface and said outer surface of said bush, said ribs on said inner surface and said outer surface being arranged to induce torsional stress in the same direction of rotation.

7. The bush of claim 1, wherein said ribs are formed on said first front face.

8. The bush of claim 1, wherein said ribs are formed on said second front face.

9. A bush adapted to be radially formed into indentations in a lockbolt rivet closing part by means of a tool which applies axial forces to said bush so as to create axial tension in said bush, comprising:

- a cylinder having a hollow bore along a longitudinal axis, said cylinder having an outer surface, an inner surface, a first front face, and a second front face; and

- a plurality of projecting ribs formed on said bush for initiating rotational movement of said bush about said axis when said axial forces from said tool are applied to said bush so as to cause torsional stress in said bush, said ribs being formed on said first front face and said second front face and being arranged to induce torsional stress in opposite directions of rotation;

whereby, forming said bush around said closing part of said lockbolt rivet with said tool creates axial tension in said bush simultaneously as rotational movement of said bush causes torsional stress causing material of said bush to flow into said indentations in said closing part of said lockbolt rivet.

\* \* \* \* \*